(12) United States Patent
Kawai et al.

(10) Patent No.: US 9,667,841 B2
(45) Date of Patent: May 30, 2017

(54) IMAGE PROCESSING APPARATUS AND IMAGE PROCESSING METHOD

(75) Inventors: Yoshinori Kawai, Kawasaki (JP); Naoki Sumi, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 909 days.

(21) Appl. No.: 13/178,996

(22) Filed: Jul. 8, 2011

(65) Prior Publication Data

US 2012/0014453 A1 Jan. 19, 2012

(30) Foreign Application Priority Data

Jul. 16, 2010 (JP) .................. 2010-162292

(51) Int. Cl.
*H04N 7/12* (2006.01)
*H04N 5/14* (2006.01)
*G06T 7/20* (2017.01)

(52) U.S. Cl.
CPC .......... *H04N 5/145* (2013.01); *G06T 7/2033* (2013.01); *G06T 2207/10016* (2013.01); *G06T 2207/20016* (2013.01)

(58) Field of Classification Search
CPC ......... G06T 2207/20016; G06T 7/2033; G06T 2207/10016; G06T 2007/20016; H04N 19/00424; H04N 5/145
USPC .................................... 375/240.16
See application file for complete search history.

(56) References Cited

U.S. PATENT DOCUMENTS

| | | | | |
|---|---|---|---|---|
| 6,480,615 B1* | 11/2002 | Sun et al. | ...... | 382/103 |
| 6,535,632 B1* | 3/2003 | Park et al. | ...... | 382/164 |
| 6,618,443 B1* | 9/2003 | Kim et al. | ...... | 375/240.21 |
| 6,894,639 B1* | 5/2005 | Katz | ...... | 342/90 |
| 7,847,823 B2 | 12/2010 | Habuka et al. | | |
| 2008/0260282 A1* | 10/2008 | Hasegawa | ...... | 382/260 |
| 2009/0028452 A1* | 1/2009 | Kimoto | ...... | 382/238 |
| 2009/0185721 A1* | 7/2009 | Hiraga et al. | ...... | 382/107 |

(Continued)

FOREIGN PATENT DOCUMENTS

| | | |
|---|---|---|
| JP | H10-051793 A | 2/1998 |
| JP | 2004-343483 A | 12/2004 |

(Continued)

OTHER PUBLICATIONS

U.S. Appl. No. 13/178,978, filed Jul. 8, 2011.

*Primary Examiner* — Gims Philippe
*Assistant Examiner* — Joseph Becker
(74) *Attorney, Agent, or Firm* — Fitzpatrick, Cella, Harper & Scinto

(57) ABSTRACT

A processor executes a program and reduces reference and comparative images to reduced reference and comparative images, in a ratio of ½, by setting a pixel signal value of each pixel in each image using pixel signal values for each of four pixels in each of the images. The processor specifies (i) a first corresponding point similar to a first feature point included in the reduced reference image, from the reduced comparative image, using a first filter for 3×3 pixels, and (ii) a second corresponding point similar to a second feature point in the reference image, corresponding to the first feature point, from the comparative image, using a second filter for 5×5 pixels, on the basis of a position of the first corresponding point specified in the reduced comparative image.

16 Claims, 11 Drawing Sheets

(56) References Cited

U.S. PATENT DOCUMENTS

| | | | | |
|---|---|---|---|---|
| 2009/0324013 | A1* | 12/2009 | Tanaka | 382/103 |
| 2010/0067865 | A1* | 3/2010 | Saxena | G06T 7/2033 386/278 |
| 2010/0097642 | A1 | 4/2010 | Sumi | |

FOREIGN PATENT DOCUMENTS

| | | |
|---|---|---|
| JP | 3935500 B2 | 6/2007 |
| JP | 2008-192060 A | 8/2008 |

\* cited by examiner

IMAGE PROCESSING APPARATUS AND IMAGE PROCESSING METHOD

BACKGROUND OF THE INVENTION

Field of the Invention

The present invention relates to a technique of calculating a motion vector between a plurality of frame images. Specifically, the present invention relates to an image processing apparatus capable of improving accuracy in the calculation of the motion vector without increasing a processing load.

Description of the Related Art

There has been known a technique of selecting one image from a plurality of (n+1) frame images of a video image as a reference image and basing this reference image to calculate respective motion vectors for the other n frame images (comparative images).

Generally in the calculation of the motion vector, a feature point such as a corner of an object is extracted from the reference image and a point corresponding to the extracted feature point is obtained from each of the other n object images. For a technique of calculating motion vector at high speed, there has been known a technique of calculating a feature amount for every x pixels not in the reference image but in a blurred reference image (in a changed resolution) (refer to Japanese Patent Publication No. 3935500 specification, for example). As a similar technique, it has been known to be able to realize a high-speed feature point extraction by extracting the feature point in a reduced image which is obtained by the reduction of the reference image size.

SUMMARY OF THE INVENTION

In each of images constituting a video image photographed by the use of a photographic system, sometimes a blur is included around the feature point such as a corner of an object depending on a lens characteristic and a sensor characteristic. By the influence of the blur included in an image, the extraction result is sometimes different depending on a reduction method with respect to the accuracy in the extraction of the feature point from an image except the reference image such as a reduced image. Further, when the feature point is extracted from an image except the reference image, sometimes the position of the feature point is different from that in the case of extracting the feature point from the reference image.

Accompanying such a position shift of the feature point, there is a problem that the calculation accuracy of the motion vector is degraded. However, the technique described in the specification of Japanese Patent Publication No. 3935500 does not mention anything about the accuracy degradation by the influence of the blur caused by the photographic system and the accuracy degradation accompanying the position shift of the feature point in the succeeding motion vector calculation when the feature point is extracted from an image except an original size image.

Accordingly, the present invention solves the above problem by extracting the feature point appropriately from a plurality of images and improving the accuracy of the motion vector.

An image processing apparatus according to the present invention for solving the above problem comprises: an input unit configured to input a plurality of images; a reduction unit configured to reduce a first image of the plurality of images input by the input unit to a reduced image in a predetermined ratio; a specification unit configured to specify a feature point included in the reduced image, on the basis of image data of the reduced image by the reduction unit; a designation unit configured to designate a feature point in the first image so that the feature point corresponds to the feature point specified by the specification unit in the reduced image; a calculation unit configured to calculate a corresponding point which is similar to the feature point designated by the designation unit in the first image, from a second image of the plurality of images by using a filter, the filter being corresponding to the predetermined ratio at time of reducing the first image by the reduction unit; and a determination unit configured to determine a motion vector between the first image and the second image on the basis of the feature point designated by the designation unit and the calculated corresponding point.

According to the present invention, it is possible to extract the feature point appropriately from a plurality of images and to improve the accuracy of the motion vector.

Further features of the present invention will become apparent from the following description of exemplary embodiments (with reference to the attached drawings).

DESCRIPTION OF THE EMBODIMENTS

Example 1

Hereinafter, an embodiment of the present invention will be described in detail with reference to the drawings.

Figure 1:
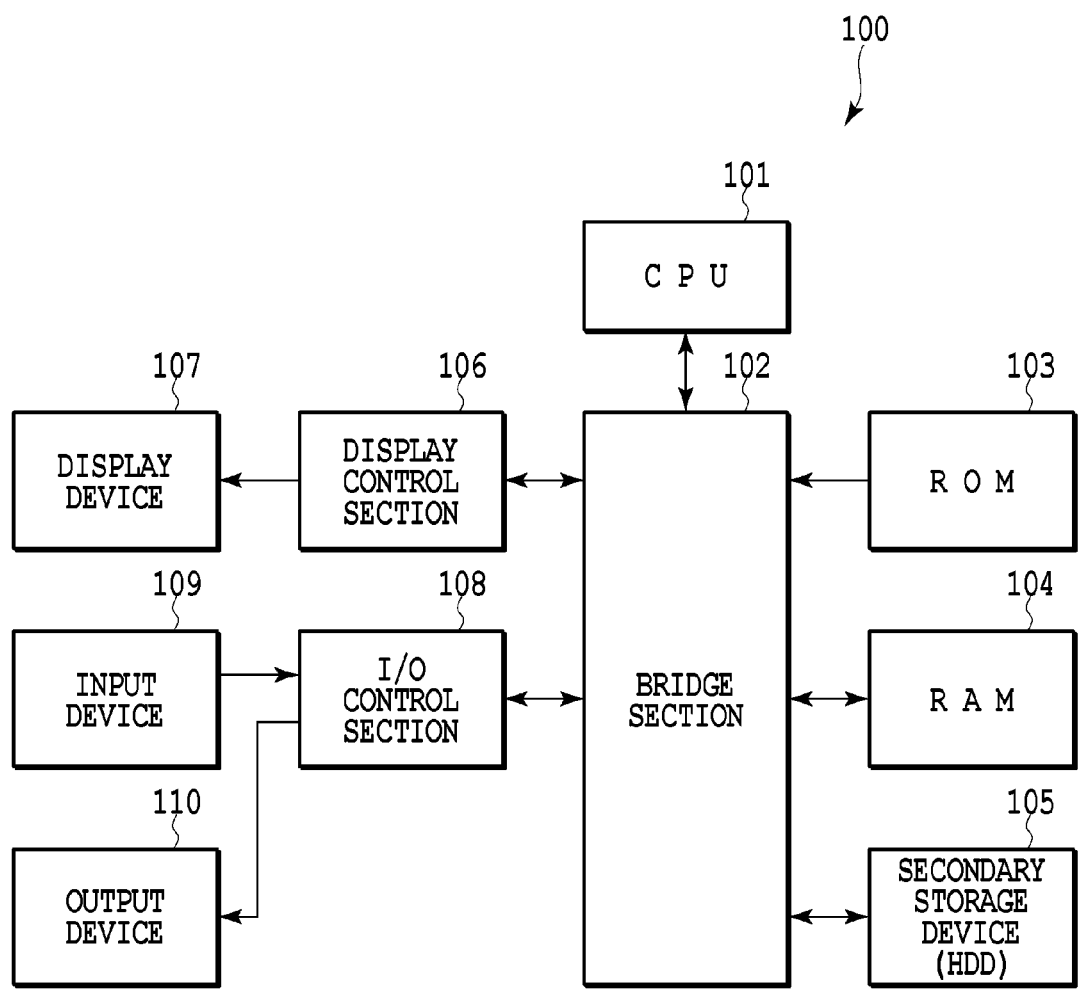
FIG. 1 is a block diagram of an image processing apparatus in the present invention.

FIG. 1 shows a block diagram of an image processing apparatus 100 according to the present invention.

A CPU 101 is configured with a central processing unit and controls the entire operation of the image processing apparatus 100.

A bridge section 102 controls the transmission and reception of data between the CPU 101 and the other components.

A ROM (Read Only Memory) 103 is a read-only non-volatile memory, and stores a program generally called a BIOS (Basic Input/Output System). The BIOS is a program executed first when the image processing apparatus is activated and a program group for controlling peripheral devices such as a secondary storage device 105, a display device 107, an input device 109, and an output device 110.

A RAM (Random Access Memory) 104 has a storage area capable of high-speed read and write, and stores various kinds of information.

The secondary storage device 105 is a HDD (Hard Disk Drive) providing a high-capacity storage area, and stores various kinds of information. An OS (Operation System) stored in the HDD is executed when the BIOS is executed. The OS provides a basic function which can be utilized by all applications, management of the application, and a basic GUI (Graphical User Interface).

The application provides a UI (User Interface) realizing a function specific to the application through a combination with the GUI provided by the OS. The OS, an execution program of the other applications, and data used for working are stored in the RAM 104 or the secondary storage device 105 as needed.

A display control section 106 converts a result of processing, which is instructed by a user and performed via the OS and the application, into image data and performs the control for displaying the image data on the display device 107.

The display device 107 is a device capable of displaying various kinds of image such as a liquid crystal display and a CRT (Cathode Ray Tube) display.

An I/O control section 108 is an interface for controlling information input/output in the input device 109 and the output device 110. For example, the I/O control section 108 is USB (Universal Serial Bus), PS/2 (Personal System/2), or the like.

The input device 109 is configured with a keyboard, a mouse, and the like and receives various kinds of instruction and information from a user. Further, a storage device such as a digital camera, a USB memory, a CF (Compact Flash) memory, and an SD (Secure Digital) memory card also corresponds to the input device 109. Then, it is also possible to transfer image data retained by the input device 109 to the component such as the CPU 101.

The output device 110 is a printer device, for example, and capable of outputting a material to be printed.

Figure 2:
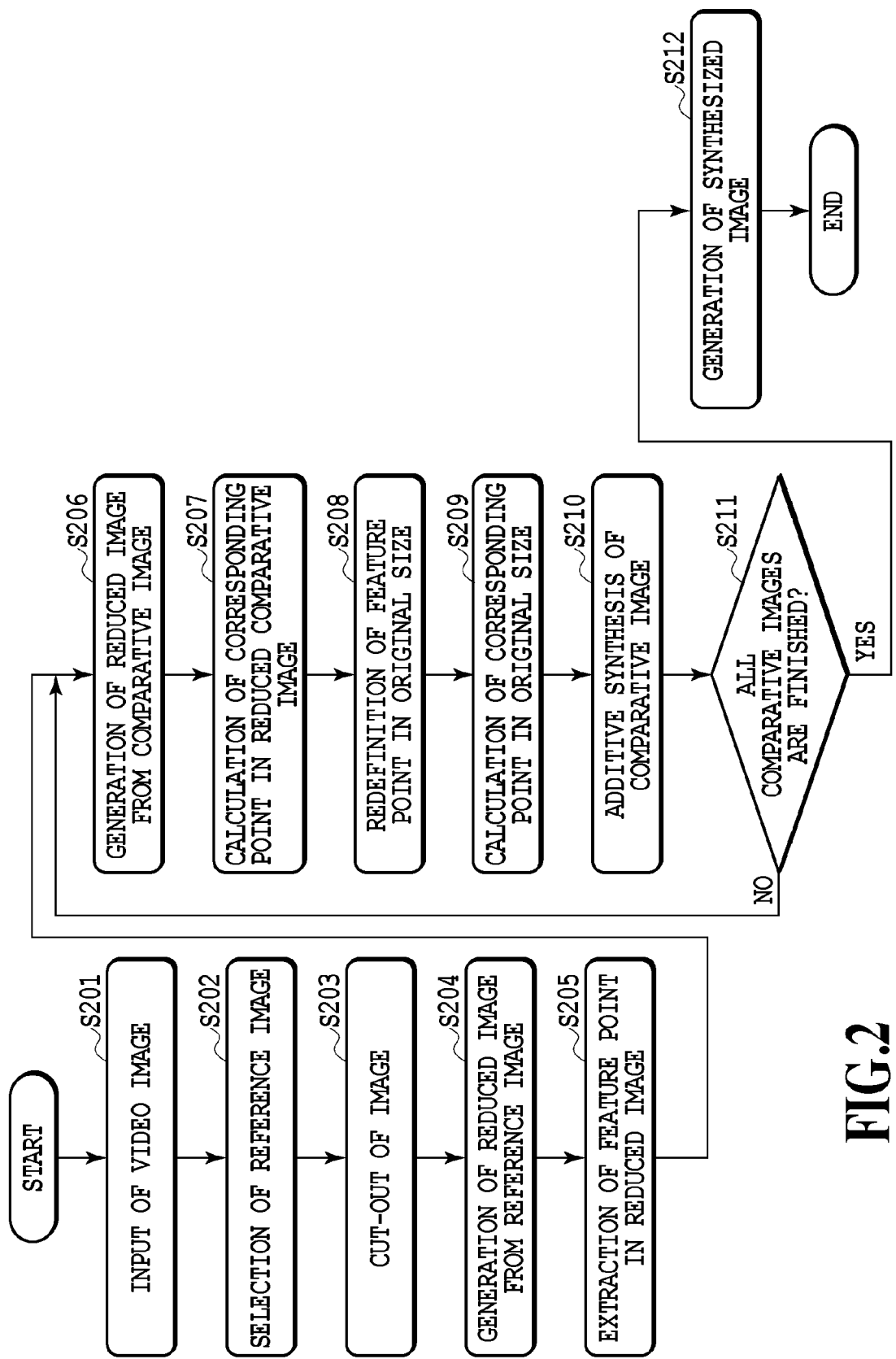
FIG. 2 is a flowchart showing an image processing sequence in Example 1 of the present invention.

FIG. 2 is a flowchart showing an image processing sequence of an image processing apparatus according to a first example of the present invention. Hereinafter, each flow of the image processing apparatus will be explained in detail. Here, the flow shown in FIG. 2 is realized when the CPU 101 reads out a program stored in the ROM 103 and executes it.

When the image processing starts, first in S201, the image processing apparatus 100 inputs a video image. For example, the video image is input into the CPU 101 from the input device 109 or the secondary storage device 105. Note that the video image is constituted by a plurality of image groups and may be a still image group including a plurality of images.

Next, in S202, the CPU 101 selects a frame image for reference (reference image) from an image group of the input video image. The selection is performed on the basis of a predetermined reference. For example, in an image group constituting the input video image, an image located at the center of the image group may be selected when the reference is a time axis. Further, the reference image may be selected according to user's preference.

Next, in S203, the CPU 101 cuts out (n+1) images (frame images) including the one selected reference image. Note that the n images except the one reference image will be called a comparative image in the following. Here, the comparative images may include n/2 images previous to the reference image and also n/2 images succeeding the reference image when n is even number, for example. Alternatively, the comparative images may include n images previous to the reference image or may include n images succeeding the reference image. Further, the comparative images may be selected by a user.

Next, in S204, the CPU 101 generates a reduced image by reducing the reference image in ½. The reduced image is an image having a pixel signal value which corresponds to an average value of pixel signal values calculated for each one unit with four pixels in the reference image as the one unit. In this manner, the reduced image has a size obtained by the reduction of the reference image in a predetermined ratio of ½.

Next, in S205, the CPU 101 performs reduced image feature point extraction for extracting a feature point from the reduced image. While there are known various methods for extracting the feature point, the present invention employs a method of extracting a corner as the feature point. This method determines a pixel having a feature amount indicating likeness to that of a corner to be the feature point among pixels of an image which is an object for the extraction. This feature amount is obtained from a plurality of pixels included in a reference region of the image.

However, the method of extracting the feature point is not limited to this one and the feature point may be extracted by way of calculating the feature amount using another extraction method. For example, when a difference between the respective signal values of neighboring pixels is defined to express edge sharpness, the feature amount is increased around a corner as the edge sharpness is higher. Then, a pixel, which has the feature amount equal to or larger than a predetermined threshold value, can be determined to be the feature point. Alternatively, by sequentially determining a pixel which has a larger value of the feature amount to be the feature point without using the threshold value, a given or larger number of feature points can be extracted from the image. Further, it is also possible to distribute the feature points in the image rather uniformly by the processing of dividing the image into a plurality of regions such that at least one or more feature points are included in one region.

Here, the influence of a blur in the extraction of the feature point and the reason why the feature point is to be extracted by the use of the reduced image will be explained. Further, a relationship between a reduction ratio of the image and the edge sharpness will be explained. Lastly, on the basis of the above, the reason why the accuracy in the extraction of the feature point is improved by the use of the reduced image which is a ½ reduction of an original image.

In an image photographed as a video image, pixels around a corner or in the vicinity of an edge sometimes provide a blur (pixel including an intermediate value between the pixels) depending on a lens characteristic of a photographic system and a sensor characteristic of a sensor such as a CCD, since the image is not a computer graphics (CG). Particularly the periphery of an edge or a corner of an object typically has pixels providing a blur and is scarcely shown sharply.

While various corners are included in such an image, all the corners are not always suitable for the feature point. That is, it is not appropriate to extract the feature point from a region corresponding to a corner or edge including a large blur amount (i.e., including many pixels providing a blur) in the image. It is preferable to extract the feature point from a corner region having a blur amount of one pixel rather than a corner region having a blur amount of two or three pixels. This is because, when pattern matching is performed and a motion vector is obtained for image synthesis after the extraction of the feature point, an error caused in the calculation of each step becomes larger by the step in a corner having a large blur amount.

When a difference between the respective signal values of the neighboring pixels is defined as edge sharpness, each of the edge sharpness is obviously different according to a blur amount. Then, as the edge sharpness becomes higher, extraction accuracy of the feature point is improved. Accordingly, by the reduction of the image, the blur amount is reduced and a difference between the respective signal values of the pixels included in the reference region of an image becomes larger, and thereby the edge sharpness is improved and the feature amount of each corner becomes larger. Accordingly, the feature point is extracted by way of reducing the image.

Figure 3A:
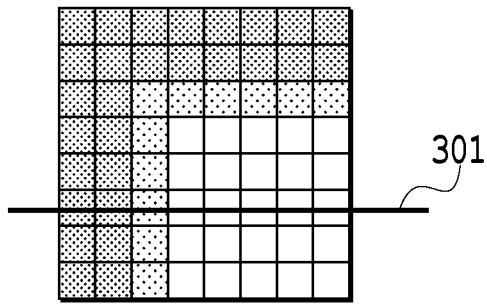
FIGS. 3A to 3C are diagrams for explaining a reduced image according to the present invention.
Figure 3B:
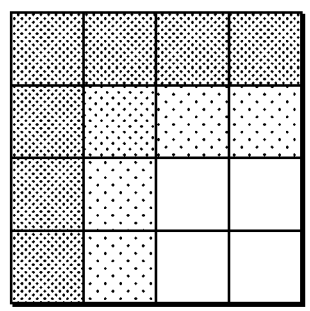
Figure 3C:
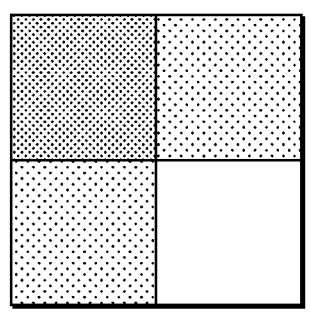

Next, a relationship between a image reduction ratio and edge sharpness will be explained by the use of FIGS. 3A to 3C and FIGS. 9A to 9G. FIG. 3A shows a reference image which is an original image not reduced. FIG. 3B shows an example of a reduced image having a size of a ½ reduction of the reference image. FIG. 3C shows an example of a reduced image having a size of a ¼ reduction of the reference image.

Figure 9A:
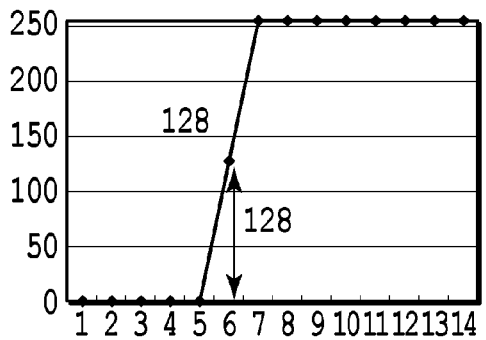
FIGS. 9A to 9G are relational charts between an image size and edge sharpness in the case of one pixel blur.

Here, FIG. 9A shows a relationship between a pixel and a signal value on the line 301 shown in FIG. 3A. In FIG. 9, the horizontal axis shows a corresponding pixel position on the line 301 and the vertical axis shows the signal value.

Figure 9B:
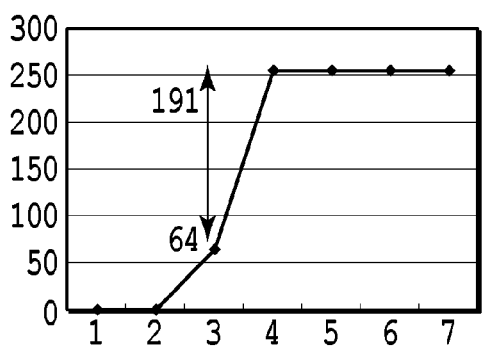
Figure 9C:
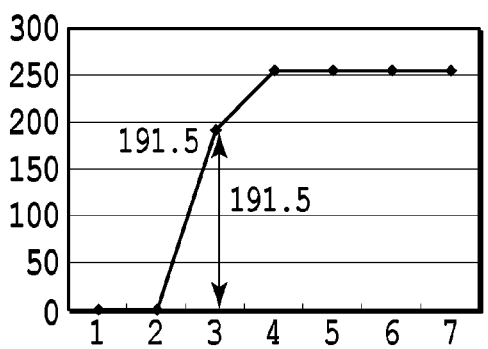

FIGS. 9B and 9C show signal values in the reduced image having a size of a ½ reduction of the original image, respectively. Further, FIGS. 9D, 9E, 9F and 9G show signal values in a reduced image having a size of a ¼ reduction of the original image, respectively. Here, the image includes an edge part of an object and thereby the signal value changes from 0 to 255. Further, the explanation is made by the use of the signal value so that a difference is most clearly understood.

FIG. 9A shows that a blur corresponding to one pixel occurs at the edge part. That is, the sixth pixel shows an intermediate value of 128 in the signal value at the edge part (between pixels 5 and 7) and this sixth pixel corresponds to a blur. Here, it is assumed that the edge sharpness becomes higher as the signal value difference becomes larger. The signal value difference is 128 at maximum in this case (FIG. 9A). Note that a part where the signal value difference is the largest is indicated by an arrow in FIGS. 9A to 9G (this part indicated by the arrow will be explained as a signal value difference in the following).

Next, the reduced image which has a size of a ½ reduction of the original image will be explained. In the ½ reduction, while actually the signal value is an average of the respective signal values of four pixels, the examples shown in FIGS. 9B and 9C are expressed in one-dimensional data and an average for two pixels is used for the signal value in this case. Here, since there are two kinds of combination of the pixels to be averaged, two kinds of data exist as shown in FIGS. 9B and 9C. Note that, the image size is reduced in ½ and thereby the total number of pixels in one image is reduced as apparent also from the comparison between FIG. 3A and FIG. 3B. Here, the signal value difference shown in 9B is 191 and the signal value difference shown in FIG. 9C is 191.5. Accordingly, the edge sharpness is higher than in the case of FIG. 9A. This is because the signal value difference between the intermediate pixel providing a blur and either one of the neighboring pixels is larger than that in the case shown in FIG. 9A. Accordingly, since the feature amount is larger as the edge sharpness is higher, it is possible to improve the extraction accuracy of the feature point. That is, it can be concluded that the extraction accuracy of the feature point is improved by way of obtaining the feature point from the reduced image having a size of a ½ reduction of the original image rather than by way of obtaining the feature point from the original image.

Next, the reduced image which is a ¼ reduction of the original image will be explained. By further reducing the size of one image shown in FIG. 9B or FIG. 9C into a ½ size, it is possible to obtain a reduced image having a size of a ¼ reduction.

Figure 9D:
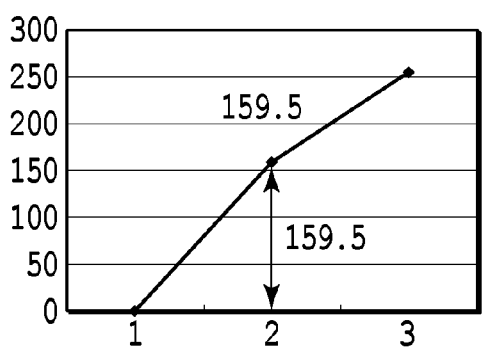
Figure 9E:
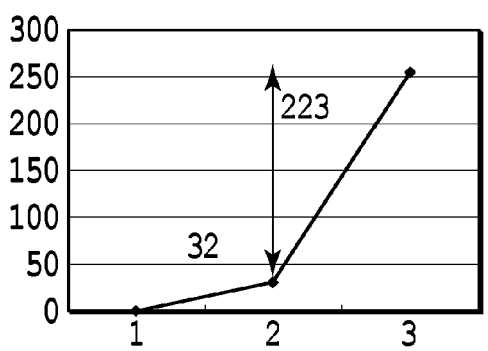
Figure 9F:
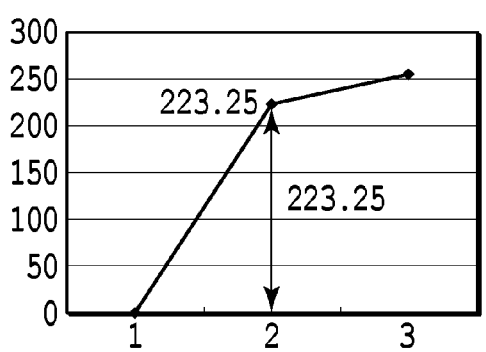

Note that, when the size in the state shown in FIG. 9B is further reduced to a ½ size, there are two kinds of pixel combination for obtaining a signal value average as same as the above, and the signal value becomes the value shown in FIG. 9D or 9E. Meanwhile, when the size in the state shown in FIG. 9C is further reduced to a ½ size, the signal value becomes the value shown in FIG. 9F or 9G. FIG. 9D shows a signal value difference of 159.5 and shows an edge sharpness higher than in the case shown in FIG. 9A. However, the signal value difference becomes smaller compared to the case shown in FIG. 9B. Further, FIG. 9E shows a signal value difference of 223 and shows a higher sharpness than in FIGS. 9A and 9B. Further, FIG. 9F shows a signal value difference of 223.25 and shows a higher sharpness than in FIGS. 9A and 9C. Moreover, FIG. 9G shows a signal value difference of 159.25 and shows a higher sharpness than in FIG. 9A but a lower sharpness than in FIG. 9C.

Figure 9G:
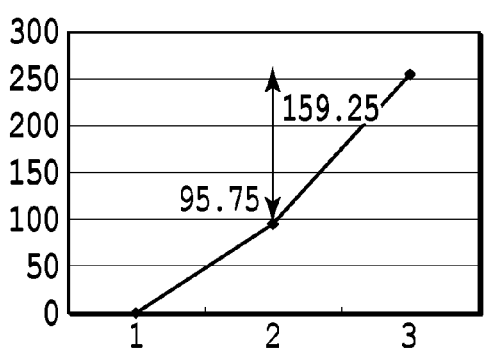

In this manner, when the original image is reduced into a ¼ size reduced image, sometimes the edge sharpness becomes lower than that in the ½ reduced image (e.g., cases of FIGS. 9D and 9G). Accordingly, in the overall judgment, it is concluded that the reduced image having a size of a ½ reduction of the original image has a signal value difference of 191 as shown in FIGS. 9B and 9C and thereby has a higher edge sharpness than the ¼ reduced image and the extraction accuracy of the feature point is improved.

That is, for extracting a corner including a blur corresponding to approximately one pixel in the original image, it is more preferable to use the reduced image having a size of a ½ reduction of the original image than to use the reduced image having a size of a ¼ reduction.

Further, the case that the original image has a blur corresponding to approximately two pixels of one column or one row and the case that the original image has a blur corresponding to approximately three pixels of one column or one row will be explained.

Figure 10A:
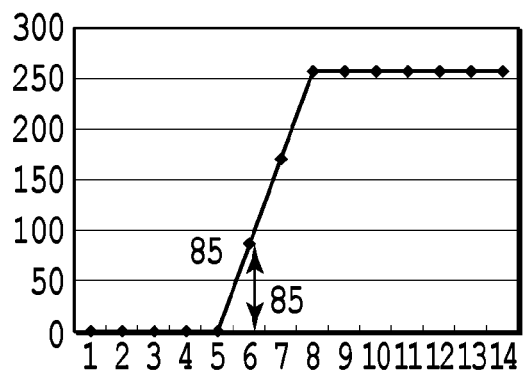
FIGS. 10A to 10D are relational charts between an image size and edge sharpness in the case of two pixel blur.
Figure 10B:
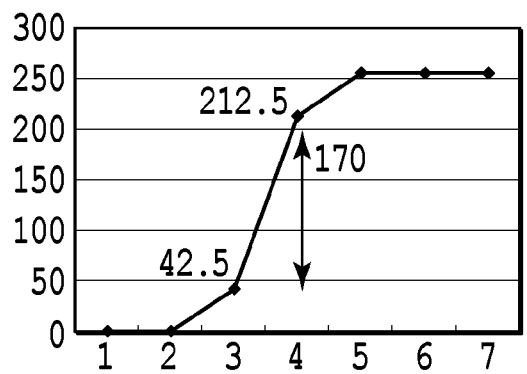
Figure 10C:
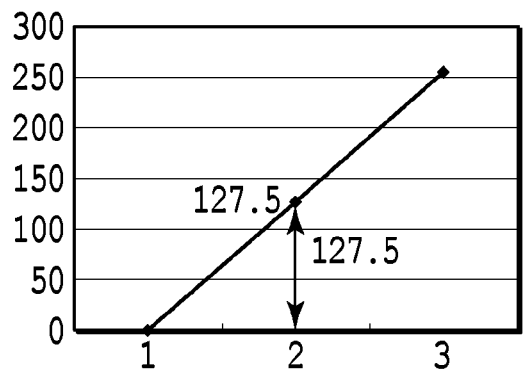
Figure 10D:
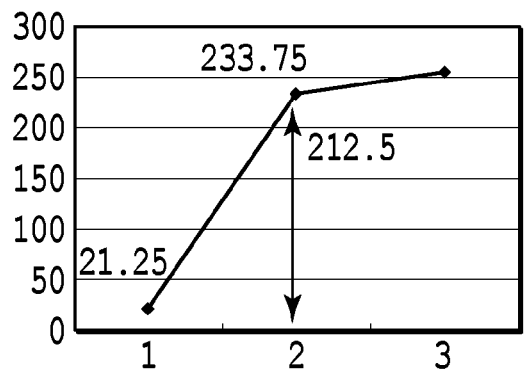

FIGS. 10A to 10D are diagrams for explaining each signal value in the case of including a blur corresponding to approximately two pixels of any one column or any one row in the original image. FIG. 10A illustrates the signal value of the original image and the signal value difference is 85. FIG. 10B shows the signal value in the reduced image having a size of a ½ reduction of the original image and the signal value difference is 170. FIG. 10C or 10D illustrates the signal value of the reduced image having a size of a ¼ reduction of the original image and the signal value difference is 127.5 or 212.5, respectively.

Figure 11A:
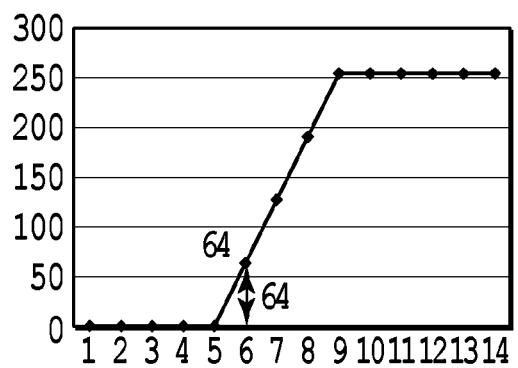
FIGS. 11A to 11D are relational charts between an image size and edge sharpness in the case of three pixel blur.
Figure 11B:
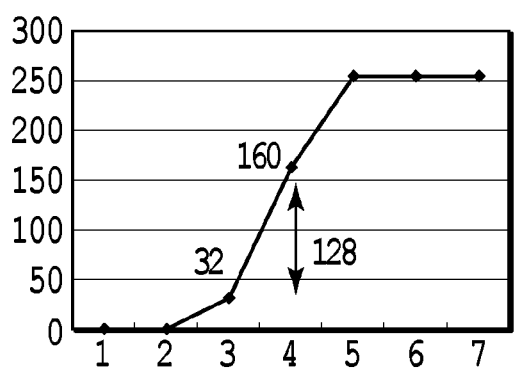
Figure 11C:
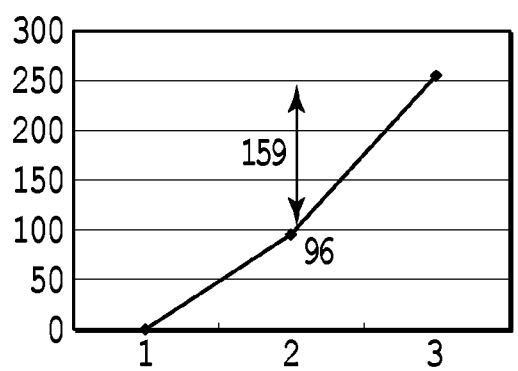
Figure 11D:
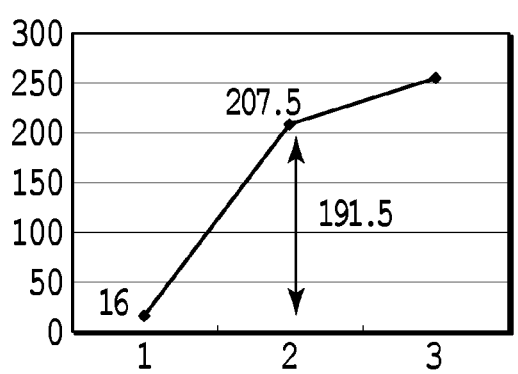

Next, FIGS. 11A to 11D are diagrams for explaining each signal value in the case of including a blur corresponding to approximately three pixels of any one column or any one line in the original image. FIG. 11A illustrates the signal value in the original image and the signal value difference is 64. FIG. 11B shows the signal value in the reduced image having a size of a ½ reduction of the original image and the signal value difference is 128. FIG. 11C or 11D illustrates the signal value in the reduced image having a size of a ¼ reduction of the original image and the signal value difference is 159 or 191.5, respectively.

From FIGS. 9A to 9G, FIGS. 10A to 10D, and FIGS. 11A to 11D, in the case of the reduction to the ½ size, the signal value difference is largest in the corner having a blur in one pixel and thereby the corner having a blur in one pixel is more easily extracted than the corner having a blur in two or three pixels. On the other hand, in the case of the reduction to the ¼ size, the signal value difference and the blur amount do not have correlation with each other for the corner having a blur in one pixel, two pixels, nor three pixels, and thereby the corner is extracted regardless the blur amount in one pixel, two pixels, or three pixels. Judging from the above result, it is more preferable to extract the feature point from the reduced image having a size of a ½ reduction of the original image for extracting a corner having a blur corresponding to approximately one pixel rather than for extracting a corner having a blur corresponding to two pixels or three pixels.

Figure 12:
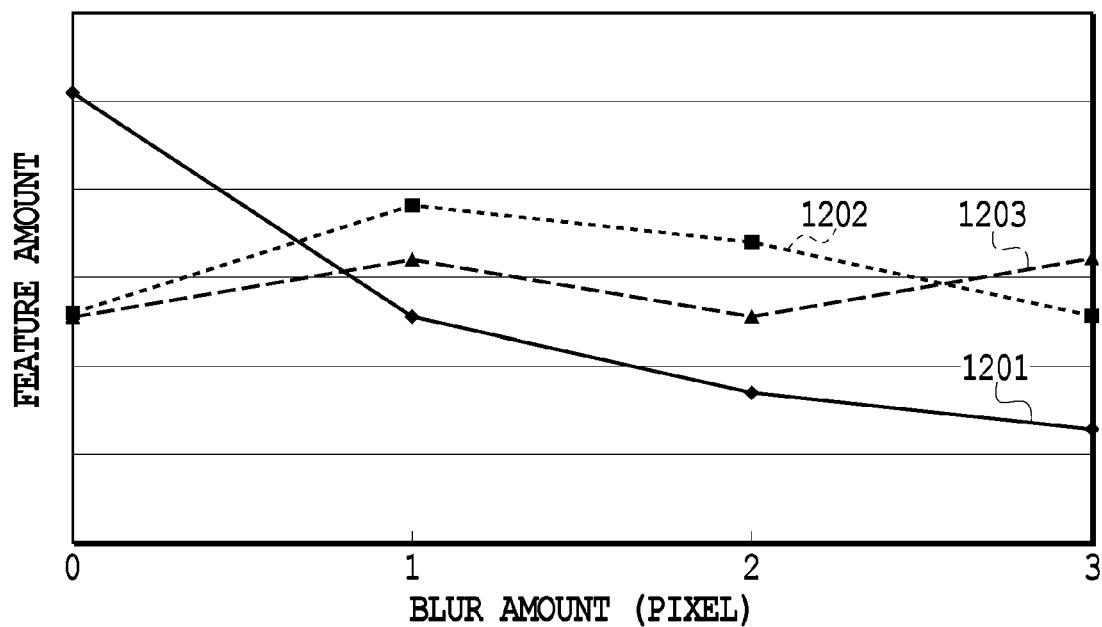
FIG. 12 is a relational chart between an image size and edge sharpness.

FIG. 12 illustrates a relationship between the number of pixels providing a blur amount in the original image and the feature amount extracted in the corner for each of the reduced image sizes (based on the results of FIGS. 9A to 9G, FIGS. 10A to 10D, and FIGS. 11A to 11D). Reference numeral 1201 indicates the feature amount when using the original image. Reference numeral 1202 indicates the feature amount when using the reduced image having a size of a ½ reduction. Reference numeral 1203 indicates the feature amount when using the reduced image of a ¼ reduction. When the feature point is extracted by the use of the original size image, the feature amount of the corner is reduced according to the increase of the blur amount. When the feature point is extracted by the use of the reduced image having a size of a ½ reduction, the feature amount becomes largest for the case of a blur corresponding to approximately one pixel, and further, the feature amount is reduced for the case of a blur corresponding to two pixels or three pixels. When the reduced image having a size of a ½ reduction is used, clearly, it is easier to extract a corner having a blur in one pixel than to extract a corner having a blur in two pixels or three pixels.

Next, when the feature point is extracted by the use of the reduced image having a size of a ¼ reduction, the feature amount of the corner is not different between blurs in one pixel and in three pixels. That is, the blur corresponding to approximately three pixels cannot be extracted first preferentially from the feature amount.

From the above reason, in the video image photographed by the photographic system, the feature point is configured to be extracted from the ½ reduced reference image in order to preferentially obtain a corner including a blur corresponding to approximately one pixel as the feature point.

Next, back to FIG. 2, in S206, the CPU 101 generates a reduced image which is a ½ reduction of each of the comparative images. Note that the generation method of the reduced image is the same as that of the generation of the reduced image in S204. That is, in the reduced image of the comparative image an average value is calculated for each one unit with four pixels in the comparative image as the one unit, and the average value is defined as a signal value in one pixel of the reduced image.

Note that, in the present example, the generation of the reduced image of the reference image and the generation of the reduced image of the comparative image are performed separately from each other as in S204 and S206, respectively. The reason is that the memory can be used efficiently by the way of deleting the comparative images and the reduced images thereof from the memory after additive synthesis of the comparative image in S210. When the memory capacity has a room, S204 and S206 may be performed in the same step to generate the respective reduced images of the reference image and the comparative image at the same time.

Next, in S207, the CPU 101 obtains a corresponding point corresponding to the feature point extracted in the reduced image of the reference image in the reduced image of the comparative image.

Specifically, the CPU 101 performs pattern matching in the periphery of the feature point in the reduced image of the reference image for obtaining a point which is similar to the feature point in the reduced image of the comparative image using a filter having a predetermined size of 3×3 pixels. That is, the CPU 101 compares respective signal values within the filter of 3×3 pixels to calculate a color difference and determines a pixel having the smallest color difference to be the corresponding point in the reduced image of the comparative image. Then, the CPU 101 calculates the respective corresponding points in the reduced image of the comparative image for all the feature points in the reduced image of the reference image.

Here, the reason why the filter of 3×3 pixels is used is that the obtained feature point is based on a corner and the size of 3×3 pixels can capture the shape of a corner. Note that the processing speed can be made further higher by the use of hierarchical pattern matching.

Next, in S208, the CPU 101 obtains a pixel providing the feature point in the reference image of the original image on the basis of a pixel providing the feature point in the reduced image of the reference image. Here, the processing in S208 will be called feature point redefinition in the following description. That is, the feature point is calculated in the ½ reduced image but has not been calculated or defined in the unreduced original image, and thereby the redefinition is necessary. At this time, the feature point is defined in a reference region of the reference image which corresponds to the reference region referred to in the feature point extraction in the reduced image.

Figure 4A:
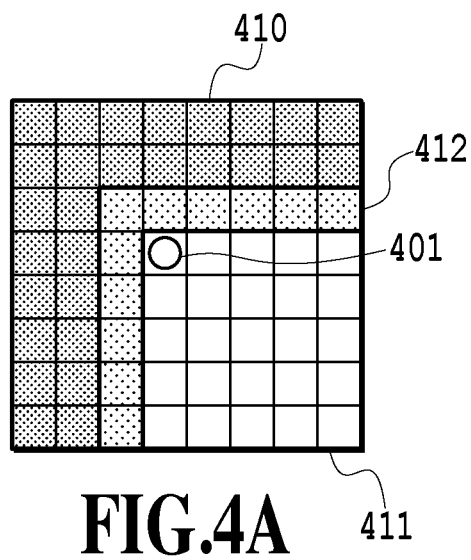
FIGS. 4A to 4D are diagrams for explaining a feature point according to the present invention.

Here, details of the processing of redefining the feature point will be explained by the use of FIGS. 4A to 4D. FIG. 4A shows a reference image which is an original image without being subjected to the reduction processing. In FIG. 4A, the signal value of each pixel in the pixel group 410 is 0 (black), the signal value of each pixel in the pixel group 411 is 255 (white), and the signal value of each pixel in the pixel group 412 is 128 (gray). The pixel in the pixel group 401 is located at a corner and is a pixel providing a feature point.

Figure 4B:
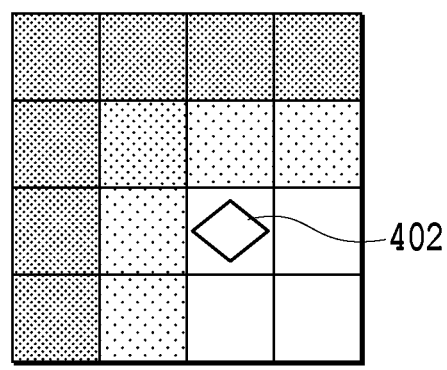

FIG. 4B shows an image subjected to the ½ size reduction processing of the original image shown in FIG. 4A. Here, the pixel indicated by Symbol 402 (rhombus) is a pixel providing a feature point.

Figure 4C:
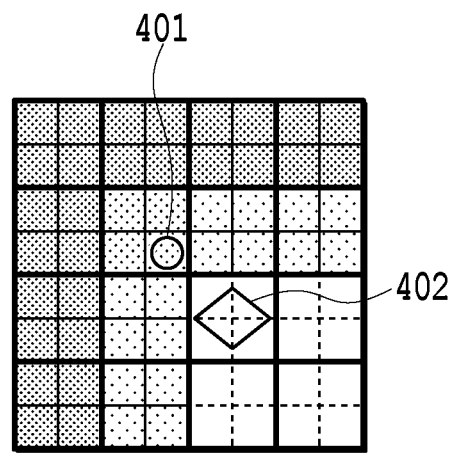

FIG. 4C is a diagram superimposing FIGS. 4A and 4B on each other. Note that, as shown in FIG. 4C, one pixel of FIG. 4B corresponds to four pixels of FIG. 4A.

Figure 4D:
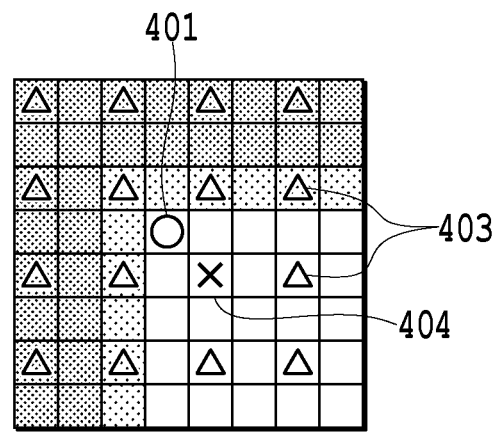

Since the ½ reduced image is generated using an average value of four pixels, it is necessary to make any one pixel of the four pixels correspond to the feature point of the original image. Here, the upper left pixel of the four pixels is determined to be the feature point of the unreduced original image. For the feature point redefinition in S208, the present example covers only a pixel corresponding to a position indicated by Symbol 403 (triangle) as an object pixel, as shown in FIG. 4D. That is, among four pixels in the reduced image, a pixel in the upper left corner is an object pixel in the redefinition. That is, in the case of the example shown in FIG. 4, among the object pixels for the redefinition, the pixel denoted by Symbol 404 (X) is an object pixel for the redefinition corresponding to the pixel denoted by Symbol 402 providing the feature point in the reduced image. Thereby, the redefining of the feature point of the image results in a shift to a pixel (pixel 404 in FIG. 4D) different from the pixel providing the feature point in the original image (pixel 401 in FIG. 4A).

In this manner, sometimes the pixel providing the redefined feature point shifts from the pixel providing the feature point of the original image before the reduction approximately by one pixel depending on the setting of the four pixels in the reduction processing. There is a case that this affects the processing of obtaining a pixel providing the feature point in the reduced image and performing the pattern matching with the original image. This influence will be described referring to FIGS. 5A-5B.

Next, in S209, the CPU 101 performs corresponding point calculation of obtaining a pixel providing a corresponding point in the comparative image on the basis of a pixel providing the feature point in the reference image which has been redefined in S208. Here, a difference between positional coordinates determined by a pixel providing the feature point and a positional coordinates determined by a pixel providing the corresponding point provides a motion vector.

In the processing of obtaining a pixel providing the corresponding point in S209, the corresponding point in the comparative image is calculated by the use of a filter larger than the filter used in the pattern matching between the reduced images in S207. In the processing, the CPU 101 performs pattern matching between the reference image and the comparative image using a filter corresponding to 5×5 pixels covering the periphery of the feature point of the reference image. That is, the CPU 101 compares the respective signal values with each other in the pixels within the filter of 5×5 pixels to calculate a color difference and determines a pixel having the smallest color difference to be the corresponding point in the comparative image. Note that, since the corresponding point in the reduced image of the comparative image has been already obtained in Step S207, the pattern matching may be performed only for a search range of a vicinity region of the corresponding point and the processing can be performed efficiently. Then, the CPU 101 calculates a motion vector using a difference between the respective coordinate values of the feature point and the corresponding point. Further, the similar calculation is performed for all the corresponding points.

Here, a specific example will be explained for the pattern matching between the reference image of the original image and the comparative image using the filter having a size of 5×5.

Here, an example of the pattern matching will be explained when a pixel denoted by Symbol 404 in FIG. 4D is assumed to be the redefined feature point.

Figure 5A:
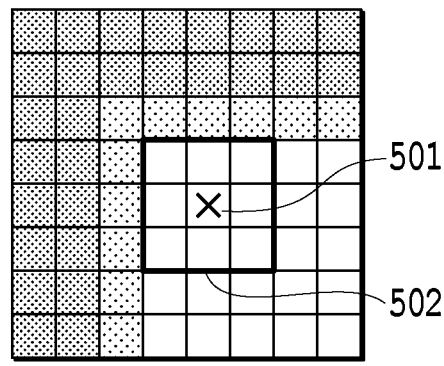
FIGS. 5A and 5B are diagrams for explaining conventional pattern matching.
Figure 5B:
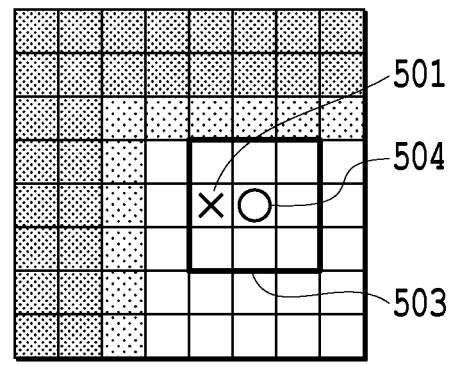

Here, when a filter corresponding to 3×3 pixels, which is the same size as a filter used by a pattern matching in the reduced image, is used, the following problem sometimes occurs. That is, as shown in FIG. 4D, sometimes the feature point, when having been redefined in the original size image, is shifted from the original position and, when a filter is used for this redefined feature point, the edge is not included within the filter. For example, when a filter of 3×3 pixels is used for the pixel 401, which is the original feature point in the original size image shown in FIG. 4D, the edge is included within the filter since the gray pixels located on the left and upper sides of the pixel 401 are included. However, it is found that the edge is not included when the filter of 3×3 pixels is set for the pixel 404 providing the redefined feature point. Thereby, when the filter of 3×3 pixels is used for the pattern matching in the original size image, sometimes the feature point in the comparative image cannot be calculated appropriately. For example, the pixel denoted by Symbol 501 (X) shown in FIG. 5A is assumed to be a pixel to be determined as a corresponding point in the comparative image. At this time, in the pattern matching, the highest matching level is expected to be obtained between the feature point and the corresponding point when the filer is positioned at Position 502. However, also when the filter is positioned at Position 503, the same matching level is obtained as that for Position 502. In this case, there is a problem that the pixel denoted by Symbol 504 is processed as the pixel providing the corresponding point. Accordingly, the corresponding point is caused to be shifted from the expected corresponding point and further the motion vector value is also caused to be shifted.

Since the feature point exists at a corner, a filter having a size of 3×3 pixels can capture the shape of the corner to compare the respective corresponding points of the reference image and the comparative image with each other by the pattern matching using a filter of 3×3 pixels. However, when the feature point is calculated in the reduced image and the pattern matching is performed in the unreduced original image, there occurs a case that the corresponding point is shifted from the original feature point approximately by one pixel, in this manner. In this case, the pattern matching sometimes cannot be performed correctly by using a typical filter of 3×3.

For solving this problem, it is possible to improve the accuracy of the corresponding point to be obtained by using a filter having a size of 5×5 larger than 3×3. When the reference image is reduced in ½ and the feature point is extracted, there is a possibility that the corresponding point shifts from the original feature point of the reference image by one pixel, and thereby a filter having a size of 5×5 pixels which is larger than the filter having a size of 3×3 pixels vertically and horizontally by one pixel is used.

Figure 6A:
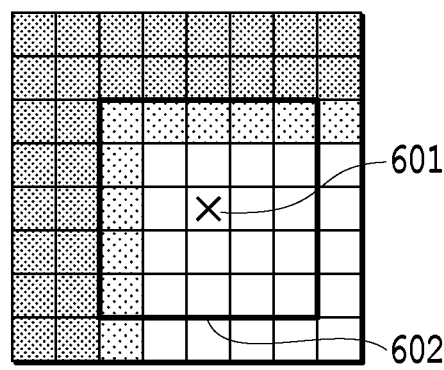
FIGS. 6A and 6B are image diagrams of pattern matching according to the present invention.
Figure 6B:
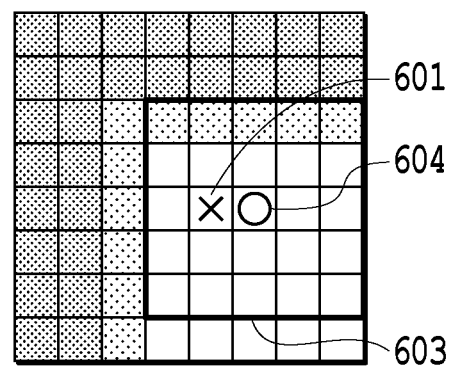

A specific example will be explained for a case of using a filter of 5×5 shown in FIGS. 6A and 6B. Here, the pixel denoted by Symbol 601 (X) in FIGS. 6A and 6B is assumed to be a pixel expected to be obtained as the corresponding point.

When the filter is located at Position 602 in the pattern matching, the matching level between the feature point and the expected corresponding point (pixel denoted by Symbol 601) becomes high. On the other hand, when the filter is located at Position 603, the matching level between the feature point and the expected corresponding point becomes low.

In this manner, when the filter of 5×5 is used in the pattern matching, the matching level becomes the highest for the case in which the filter is located at Position 602. Then, a pixel providing the corresponding point obtained at this position is the pixel denoted by Symbol 601 and coincides with the expected corresponding point. When the corresponding point shifts from the original feature point approximately by one pixel, for absorbing the shift of the feature point, it is preferable to use a filter having 5×5 or more pixels in the pattern matching, and thereby it becomes possible to keep a high calculation accuracy of the motion vector.

Next, in S210, the CPU 101 performs the deformation of the comparative image using the motion vector and performs additive synthesis for the reference image and the deformed comparative image. Because of the change of composition and the like caused by the movement of an object, tracking of the object, or camera shake, a shift is caused in the synthesized image when the reference image and the comparative image are combined as it is.

Accordingly, for avoiding the synthesis shift, it is necessary to perform the deformation of the comparative image by using the calculated motion vector and to cause the respective positions of the object to match with each other between the reference image and the comparative image. When the reference image and the comparative image are combined after that, noise reduction and the like become possible. Further, since the motion vector has been calculated only for the feature point, it is necessary to calculate a motion vector for a point except the feature point by interpolation calculation. There is considered a method in which a Delaunay triangle is generated having the feature point (corresponding point) as an apex and the interpolation calculation is performed using this triangle. Further, for the second and the succeeding comparative images, the previous additively-synthesized image and the deformed comparative image are subjected to the additive synthesis and a new additively-synthesized image is generated. The motion vector for a point except the feature point is calculated by the interpolation calculation, and thereby, if the corresponding point in the original size is not calculated accurately in S209, this affects the other motion vector and also affects the overall accuracy.

In the processing before S211, the additive synthesis between the reference image and the one comparative image is completed.

Next, in S211, the CPU 101 determines whether the processing for the n comparative images has been completed or not. If NO, the CPU 101 performs the processing from S206 again for the unprocessed comparative image and generates the additively-synthesized image. If YES, the process goes to S212.

Then, in S212, the CPU 101 generates a synthesized image by dividing the generated additively-synthesized image by (n+1), since the additively-synthesized image is synthesized from (n+1) images.

As described above, the present invention can generate a synthesized image from a plurality of images while improving the extraction accuracy of the feature point and keeping a high accuracy in the vector calculation of the motion vector when the feature point is extracted in the reduced image and the motion vector is calculated. Note that the size of the filter used in the original size image may be determined according to a reduction rate in the reduced image generation in S204 and S206. As described above, when the image was reduced in ½, the filter of 5×5 pixels larger than the filter of 3×3 pixels by one pixel in the upper, lower, right, and left directions was used, since the feature pint could be shifted from the original position by one pixel in the upper, lower, right, or left direction by the redefinition of the feature point. However, when the image is reduced in ¼, a filter of 9×9 pixels larger than the filter of 3×3 pixels by three pixels in the upper, lower, right, and left directions is used, since the feature point may be shifted from the original position by three pixels in the upper, lower, right, or left direction by the redefinition of the feature point. Further, when the reduction rate of the image is changed dynamically depending on the contents of the image, the load situation of the CPU 101, and the like, the size of the filter to be used for the original size image may be determined according to the reduction rate. Further, in the above explanation, not the filter of 3×3 pixels but the filter of 5×5 pixels was used in consideration of the possibility that the feature point was shifted by one pixel from the original position, when the pattern matching was performed for the featured point redefined in the original size image. However, regardless of the filter size, the filter may be used while being shifted by the unit of a pixel in consideration of the feature point shift. That is, while the center of the filter is being shifted by one pixel so as to cause each of plural pixels corresponding to the feature point of the reduced image to be centered, the pattern matching is performed plural times for the respective plural images in the original size image. For example, in FIG. 4D, the pattern matching is performed four times in the original size image by way of shifting the center of the 3×3 pixel filter so as to cause each of the four pixels corresponding to the pixel 402 in the reduced image to be centered. Thereby, when the pixel 401 of FIG. 4D is centered, similarity between the feature point of the reference image and the corresponding point of the comparative image is maximized and the motion vector can be determined appropriately.

Example 2

Figure 8:
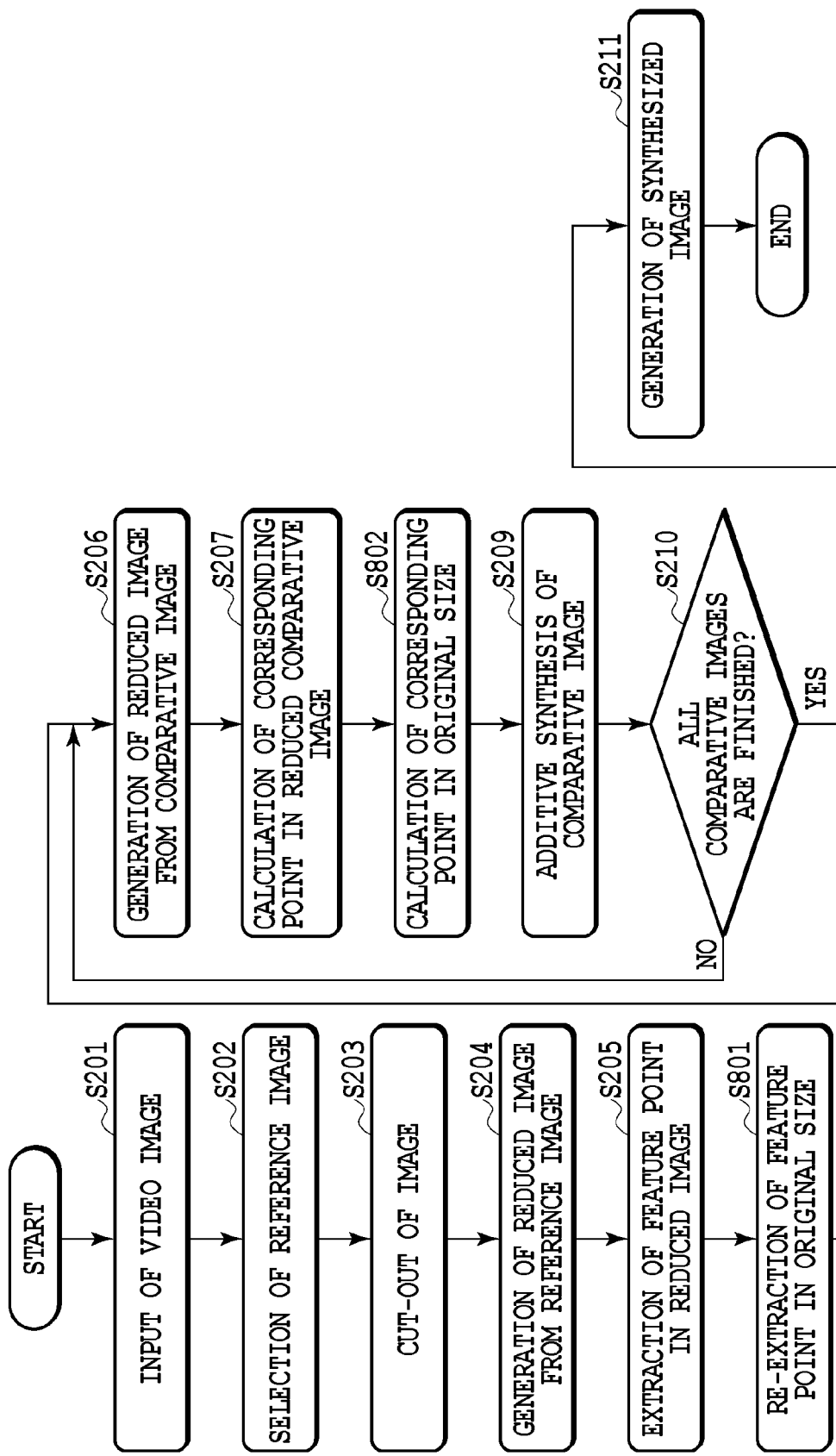
FIG. 8 is a flowchart showing an image processing sequence in the image processing of Example 2 in the present invention.

In the following, a method for determining the motion vector will be explained in detail by the use of FIG. 8. Note that, when the same processing as in FIG. 2 is performed, detailed explanation thereof will be omitted.

Here, Example 2 keeps a high accuracy of the motion vector using another method which is different from that of Example 1. That is, in S801, a feature point is re-extracted from the reference image of the original image. Further, in S802, a corresponding point is obtained for the original image by the use of the re-extracted feature point.

Figure 7:
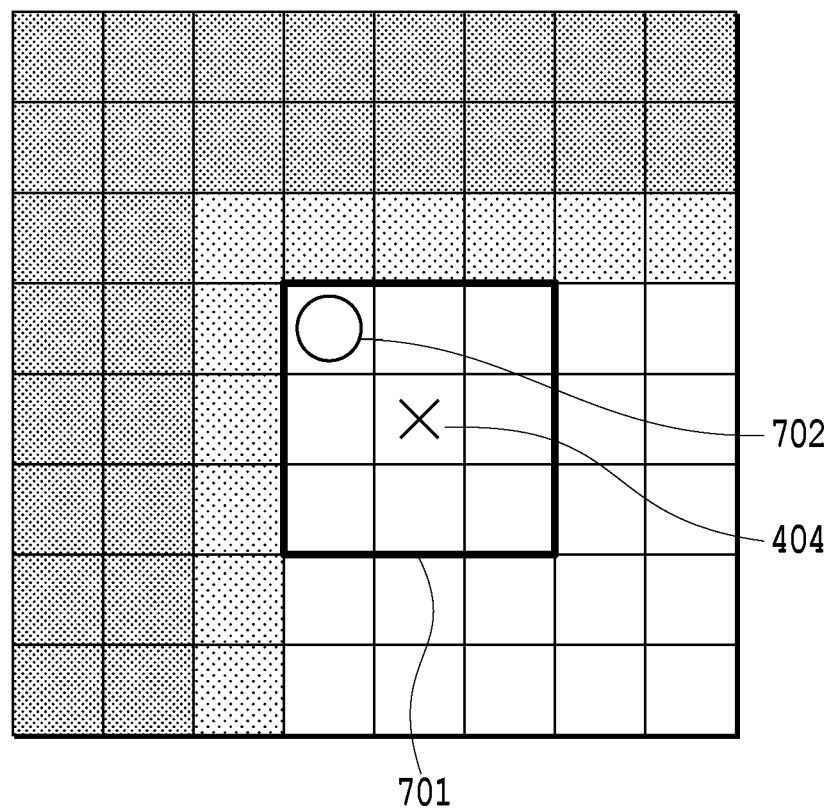
FIG. 7 is a diagram for explaining re-extraction of a featured point in Example 2 of the present invention.

First, in S801, reference image feature point extraction, which re-extracts a feature point from the reference image of the original image, will be explained. FIG. 7 shows the reference image of the original image. Here, a pixel denoted by Symbol 404 providing the feature point is extracted from the reduced image of the reference image. Then, a vicinity region 701 is set in the vicinity of the pixel including the pixel itself. Since a true feature point of the original image exists in the vicinity of the pixel providing the feature point obtained from the reduced image, pixels included in the vicinity region 701 are re-searched and thereby a point which provides the largest feature amount is re-extracted as a feature point. Then, the pixel denoted by Symbol 702 obtained by the re-searching becomes a pixel providing the feature point. This pixel providing the feature point is a pixel existing at a corner and a pixel providing the most appropriate feature point.

In this manner, a pixel providing the largest feature amount is selected within a region which is limited to the vicinity region of a pixel providing the feature point in the reduced image, and thereby a pixel providing the feature point in the original image can be also re-extracted.

Then, when the feature point obtained by the re-searching is used, the shift of the feature point does not exist and thereby the problem as explained using FIG. 4D does not occur in the pattern matching. Accordingly, when a corresponding point in the original size image is obtained by the use of the feature point re-extracted in S802, the pattern matching can be performed without limiting the filter size.

Note that, while the processing in each of the steps in the examples is explained to be performed in one image processing apparatus, the processing in each of the steps may be performed in a different apparatus. Additionally, though it is explained that one processor (the CPU 101) executes the process in the above example, it may be possible that some processors cooperatively execute the process.

Further, the present invention is also realized by way of carrying out the following processing. That is, software (program) realizing the function of the above described embodiment is supplied to a system or one or more apparatuses via a network or various kinds of computer-readable recording medium. Then, one or more computer (alternatively CPU, MPU, or the like) of the system or one or more apparatuses read out and executes the program. Further, the present invention can be realized also when a plurality of processors performs the processing in conjunction with one another.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer, for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-162292, filed Jul. 16, 2010, which is hereby incorporated by reference herein in its entirety.

What is claimed is:

1. An apparatus comprising:
a memory configured to store a program; and
a processor configured to execute the program stored in the memory, wherein the processor:
(A) reduces, by a factor of 2 to 1, each of (a) a reference image, having a plurality of pixels with each pixel having a pixel signal value, to a reduced reference image and (b) a comparative image, having a plurality of pixels with each pixel having a pixel signal value, to a reduced comparative image, the reducing being performed by setting a pixel signal value for each pixel in (i) the reduced reference image and (ii) the reduced comparative image using the pixel signal values for a group of four pixels in each of the reference image and in the comparative image, respectively,
(B) extracts, from the reduced reference image, a first feature point corresponding to an edge in the reduced reference image,
(C) specifies (a) a first point in the reduced comparative image that corresponds to the first feature point extracted from the reduced reference image using a first filter with a 3×3 pixel size to produce corresponding point, (b) a second feature point in the reference image based on a position of the first feature point in the reduced reference image, and (c) a second corresponding point in the comparative image that corresponds to the second feature point in the reference image using a second filter with a 5×5 pixel size, the second feature point corresponding to the first feature point, and the second corresponding point corresponding to the first corresponding point, respectively, and
(D) calculates a motion vector between the reference image and the comparative image using a difference between the second feature point and the second corresponding point.

2. The apparatus according to claim 1, wherein the processor specifies the first corresponding point on the basis of a signal value of 3×3 pixels included in the first filter in the reduced comparative image.

3. The apparatus according to claim 1, wherein the processor sets an average of signal values for each pixel in the group of four pixels in the reference image and in the comparative image, as the pixel signal value of each pixel in each of the reduced reference image and the reduced comparative image, respectively.

4. The apparatus according to claim 1, wherein the processor calculates the second corresponding point in an area of the comparative image, based on a position of the first corresponding point that is smaller than an area in the reduced comparative image used to specify the first corresponding point.

5. The apparatus according to claim 1, wherein the processor combines the reference image and the comparative image, on the basis of the motion vector.

6. The apparatus according to claim 1, wherein each of the first corresponding point and the second corresponding point is specified by comparing pixels included in each of the first filter and the second filter with each of the first feature point and the second feature point.

7. The apparatus according to claim 1, wherein the processor selects, from a plurality of frames included in a video image, a reference frame as the reference image and a comparative frame as the comparative image, and the processor determines a motion vector between the reference frame and the comparative frame.

8. The apparatus according to claim 7, wherein the processor selects the reference frame in accordance with an instruction by a user, and then selects the comparative frame in accordance with the selected reference frame.

9. A method performed by a processor by executing a program stored in a memory, the method comprising:
a reduction step of reducing, by a factor of 2 to 1, each of (a) a reference image, having a plurality of pixels with each pixel having a pixel signal value, to a reduced reference image and (b) a comparative image, having a plurality of pixels with each pixel having a pixel signal value, to a reduced comparative image, the reducing being performed by setting a pixel signal value each pixel in (i) the reduced reference image and (ii) the reduced comparative image using the pixel signal values for a group of four pixels in each of the reference image and in the comparative image, respectively;
an extracting step of extracting, from the reduced reference image, a first feature point corresponding to an edge in the reduced reference image;
a first specification step of specifying a first point in the reduced comparative image that corresponds to the first feature point extracted from the reduced reference image using a first filter with a 3×3 pixel size to produce a first corresponding point;
a second specification step of specifying a second feature point in the reference image based on a position of the first feature point in the reduced reference image;
a third specification step of specifying a second corresponding point in the comparative image that corresponds to the second feature point in the reference image using a second filter with a 5×5 pixel size, the second feature point corresponding to the first feature point, and the second corresponding point corresponding to the first corresponding point, respectively; and a calculating step of calculating a motion vector between the reference image and the comparative image using a difference between the second feature point and the second corresponding point.

10. A non-transitory computer-readable storage medium, in which a program causing a computer to execute the method according to claim 9 is stored.

11. The method according to claim 9, wherein the first specification step specifies the first corresponding point on the basis of a signal value of pixels included in the first filter in the reduced comparative image.

12. The method according to claim 9, wherein the third specification step specifies the second corresponding point in an area of the comparative image, based on a position of the first corresponding point that is smaller than an area in the reduced comparative image used in the first specification step for calculating the first corresponding point.

13. The method according to claim 9, further comprising a combination step of combining the reference image and the comparative image, on the basis of the motion vector calculated in the calculating step.

14. The method according to claim 9, wherein each of the first corresponding point and the second corresponding point is specified by comparing pixels included in each of the first filter and the second filter with each of the first feature point and the second feature point.

15. The method according to claim 9, further comprising a selection step of selecting, from a plurality of frames included in a video image, a reference frame as the reference image and a comparative frame as the comparative image, wherein the calculating step calculates a motion vector between the reference frame and the comparative frame selected in the selection step.

16. The method according to claim 15, wherein the selection step selects the reference frame in accordance with an instruction by a user, and then selects the comparative frame in accordance with the selected reference frame.

* * * * *